(12) United States Patent
Kagawa et al.

(10) Patent No.: US 7,715,723 B2
(45) Date of Patent: May 11, 2010

(54) INFORMATION-PROCESSING SYSTEM USING FREE-SPACE OPTICAL COMMUNICATION AND FREE-SPACE OPTICAL COMMUNICATION SYSTEM

(75) Inventors: Keiichiro Kagawa, Ikoma (JP); Yuki Maeda, Ikoma (JP); Jun Ohta, Ikoma (JP)

(73) Assignees: Japan Science and Technology Agency, Kawaguchi-shi (JP); National University Corporation Nara Institute of Science and Technology, Ikoma-shi (JP)

( * ) Notice: Subject to any disclaimer, the term of this patent is extended or adjusted under 35 U.S.C. 154(b) by 597 days.

(21) Appl. No.: 11/659,101

(22) PCT Filed: Jul. 27, 2005

(86) PCT No.: PCT/JP2005/013689

§ 371 (c)(1),
(2), (4) Date: Feb. 1, 2007

(87) PCT Pub. No.: WO2006/013755

PCT Pub. Date: Feb. 9, 2006

(65) Prior Publication Data

US 2008/0044188 A1 Feb. 21, 2008

(51) Int. Cl.
*H04B 10/00* (2006.01)
(52) U.S. Cl. .................. 398/131; 398/127; 398/129
(58) Field of Classification Search .......... 398/127–131
See application file for complete search history.

(56) References Cited

U.S. PATENT DOCUMENTS 6,941,076 B1 * 9/2005 Adams et al. ............... 398/130

7,457,545 B2 * 11/2008 Wirth et al. ................. 398/119

(Continued)

FOREIGN PATENT DOCUMENTS

JP    A 08-139674    5/1996

(Continued)

OTHER PUBLICATIONS

"About IrDA," Special Interest Groups or SIGs, Infrared Data Association, http://www.irda.org/displaycommon.cfm?an=1> (Jul. 2, 2004).

*Primary Examiner*—Nathan M Curs
(74) *Attorney, Agent, or Firm*—Oliff & Berridge, PLC

(57) ABSTRACT

In a system for data communication between an information terminal to be operated by a user and remote communication nodes, the present invention intends to suppress the power consumption of the information terminal. For that purpose, communication nodes 2, 3 and 4 each emit diffuse light carrying a pilot signal blinking at a low frequency to notify the presence of the communication node and an ID signal belonging to a higher frequency range, the ID signal containing inherent address etc. for identifying each communication node. A mobile phone 1 as the information terminal captures an image and processes the image data to detect the pilot signal of each communication node. Then, determining the position of each node and setting a limited range for reading the pixels around that position, the mobile phone 1 reads the detection signals of the pixels within the limited range at high speed and obtains identification information. This information is used to identify each node and eliminate influences of any other light source that apparently resembles the pilot signal.

11 Claims, 11 Drawing Sheets

U.S. PATENT DOCUMENTS

| | | |
|---|---|---|
| 7,502,053 B2 * | 3/2009 | Kagawa et al. ........... 348/222.1 |
| 2003/0058262 A1 | 3/2003 | Sato et al. |
| 2004/0161246 A1 * | 8/2004 | Matsushita et al. .......... 398/187 |

FOREIGN PATENT DOCUMENTS

| | | |
|---|---|---|
| JP | A 2001-201445 | 7/2001 |
| JP | A 2001-245253 | 9/2001 |
| JP | A 2003-179556 | 6/2003 |
| JP | A 2003-323239 | 11/2003 |
| JP | A 2003-345376 | 12/2003 |
| JP | A 2003-348390 | 12/2003 |
| JP | A 2004-235899 | 8/2004 |
| WO | WO 03/036829 A1 | 5/2003 |

* cited by examiner

Fig. 1
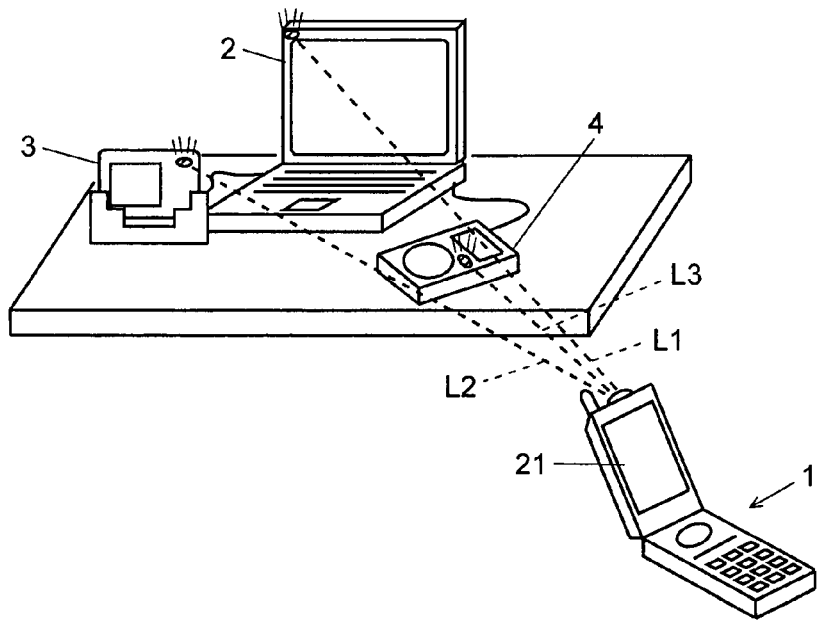
Fig. 2
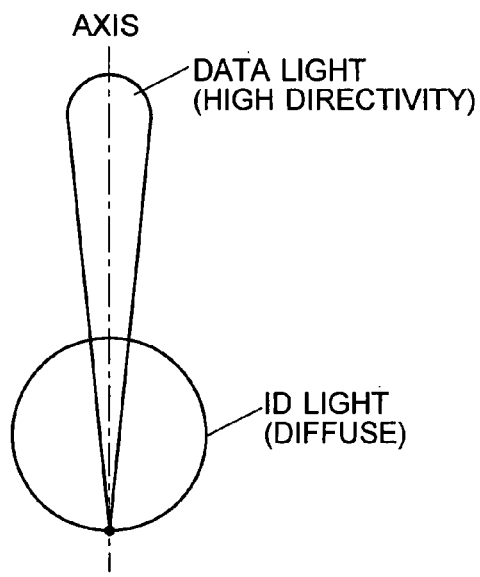
(a) LIGHT SOURCES: INDEPENDENT
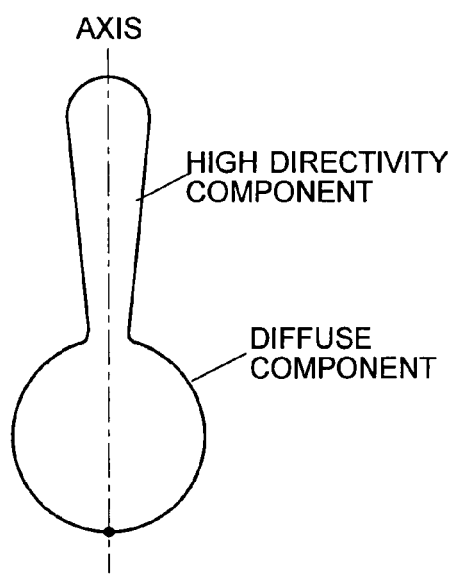
(b) LIGHT SOUCES: COMMON

Fig. 13
(a) COMMUNICATION MODE IN ID COMMUNICATION
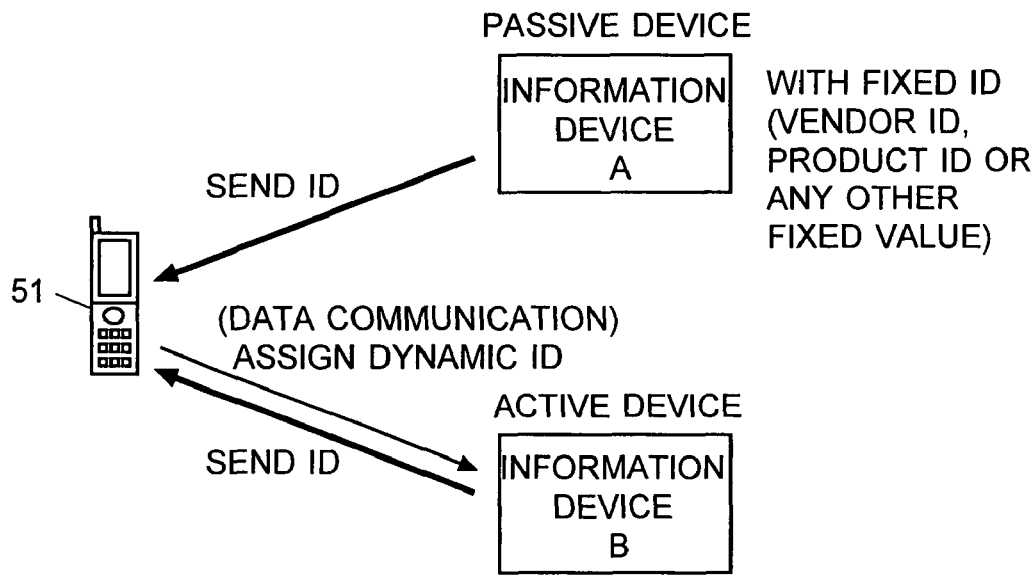
(b) COMMUNICATION MODE IN DATA COMMUNICATION
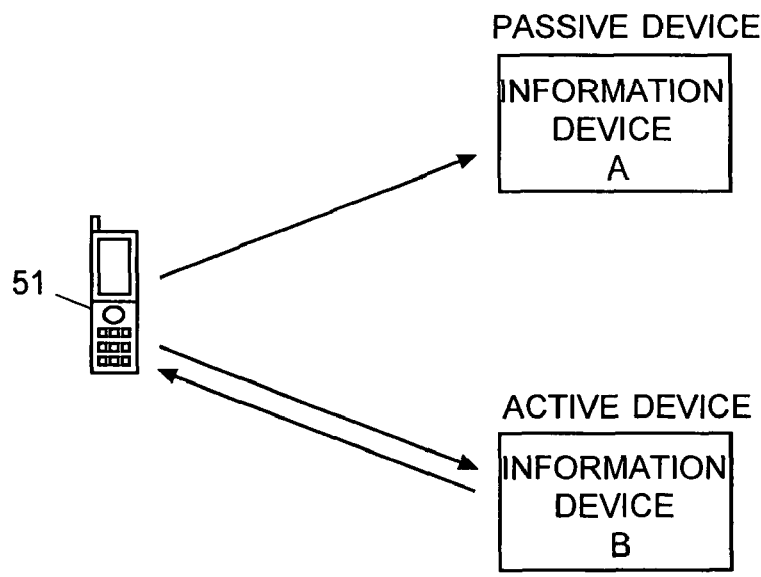

Fig. 14
(a) COMMUNICATION WITH ACTIVE DEVICE
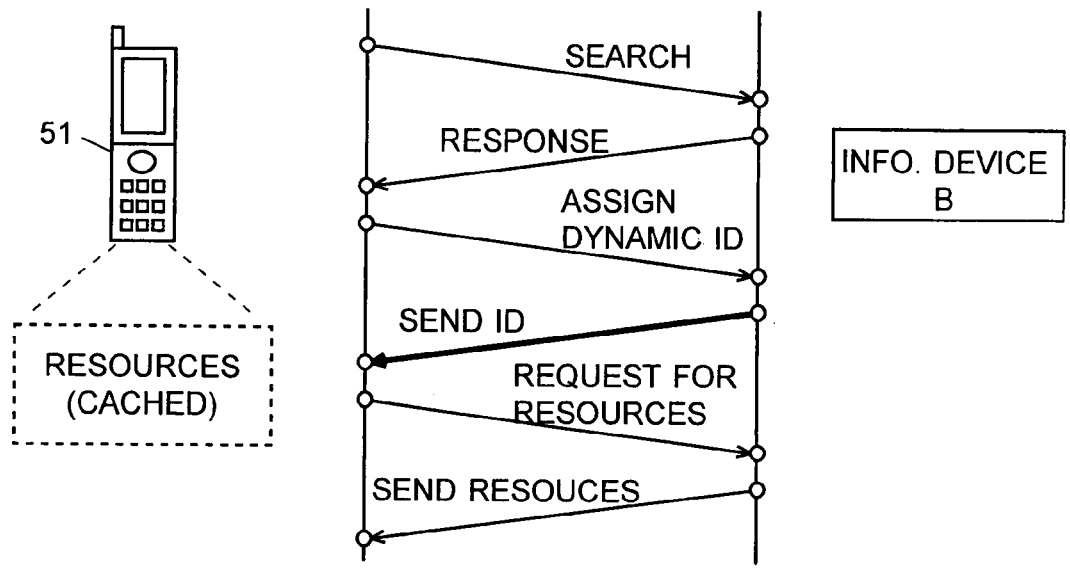
(b) COMMUNICATION WITH PASSIVE DEVICE
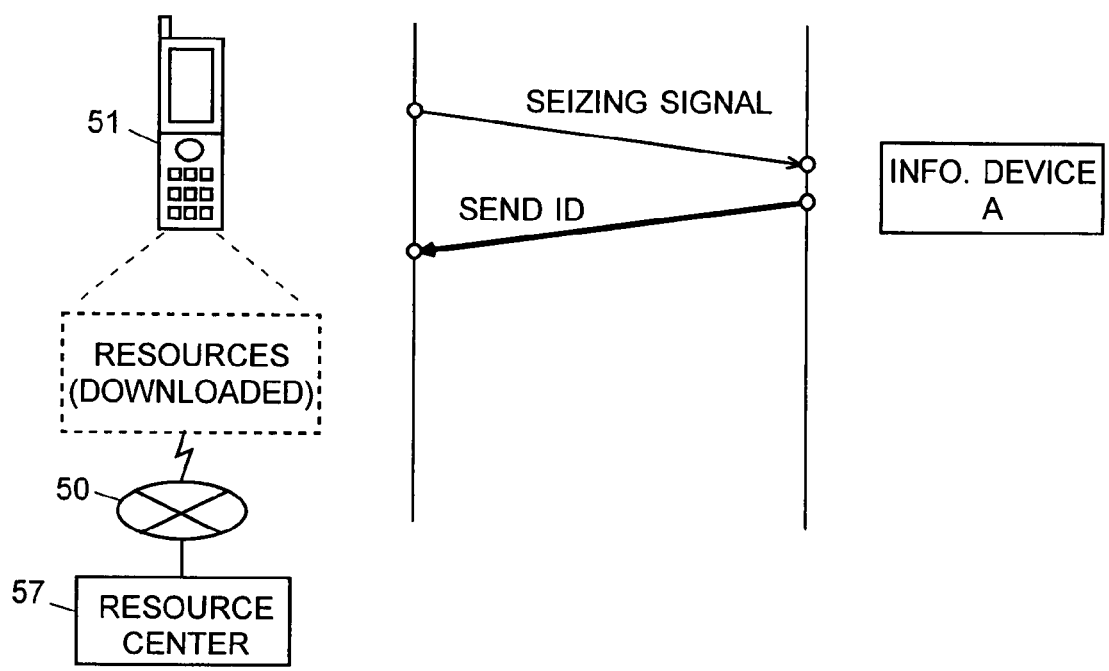

INFORMATION-PROCESSING SYSTEM USING FREE-SPACE OPTICAL COMMUNICATION AND FREE-SPACE OPTICAL COMMUNICATION SYSTEM

TECHNICAL FIELD

The present invention relates to an information-processing system having an information terminal to be operated by a user to collect predetermined items of information from each of two or more communication nodes remote from the information terminal, using free-space optical communication techniques. The present invention also relates to a free-space optical communication system that uses the aforementioned system to establish communications between an information terminal and a communication node using a beam of light or a combination of light and radio waves.

BACKGROUND ART

For wireless data communications between personal computers (PCs), mobile information terminals, PC peripheral devices and other devices located relatively close to each other, a standard of infrared data communication called the IrDA (Infrared Data Association) in general is known from, for example, Non-Patent Document 1. The IrDA standard defines a protocol for one-to-one device communications using a near infrared ray of light having a relatively high directivity (about +15 degrees). Basically, users need to adjust the position and orientation of their devices so that the two devices directly face each other for communication. Its communication speed in practical use is 4 Mbps. A newer version of the standard, called the IrBusrt, is being developed to achieve a higher speed of 100 Mbps.

In recent years, in addition to PCs and mobile information terminals, there are an increasing number of devices that can handle digital image data and/or digital audio data, with an increasing necessity for data transfer between such devices. The aforementioned infrared data communication eliminates the troublesome work of connecting cables for data transfer and is a good technique to produce a simple, low-cost system that can be used under the conditions in which the communicating devices are visible from each other at relatively short distances. Accordingly, most of the mobile phones and similar devices that have rapidly developed in recent years have the infrared communication function, which enables users to exchange phone numbers and other kinds of data between mobile phones. Moreover, some mobile phones function as a digital camera, a digital audio player, a GPS (global positioning system) terminal and other devices. Since such mobile phones can handle image/audio data, it is highly probable that the user retrieves image/audio data from PCs into his or her phone. Inversely, the user may capture images with the camera of the mobile phone and transfer the image data to a PC.

However, when, for example, a mobile phone is used for data communication with another device in the above-described conventional infrared data communication, it is not always easy to operate the phone. Since the directivity of the light used in the above-described data communication is relatively high, the user needs to manually adjust the orientation of the mobile phone so that the light emitted from the phone is correctly cast onto the target device (e.g. a PC). However, this adjusting work is not always easy because the user needs to rely solely on his or her senses to check the position of the target device and determine whether the target device is within a range in which the optical communication is performable. If at least one of the devices concerned is a mobile phone or similar device to be held by hand for operation, the device easily changes its position with the lapse of time due to hand movement, so that it is difficult to continuously maintain the communication in stable condition. If there is more than one device capable of optical communication within the communication range, the conventional techniques do not allow the user to select one of the devices as the target of the communication.

In recent years, a new type of system called the identification (ID) recognition camera system (or ID cam) has been proposed. It includes an optical beacon for emitting a blinking signal containing ID information and other items of information and a camera with a high-speed image sensor. For example, a system disclosed in Patent Document 1 captures a series of images captured with an ID recognition camera and outputs them as the scene image. Then, it decodes the blinking data of the optical beacon at maximum pixels to create an ID image. Practical applications of this ID recognition camera have been also proposed, such as an audio assist system disclosed in Patent Document 2 and an automatic photography system disclosed in Patent Document 3.

The above-described ID recognition camera system has the function of displaying an image captured with the camera, on which the ID information of each of the optical beacons detected within the captured image is shown at or near the detection point of each optical beacon, allowing users to select one or more of the optical beacons and using the related information. Such a system enables users to select one of the remote communication nodes and perform data communications with the selected communication node, using a information terminal to be held by hand.

[Patent Document 1] Unexamined Japanese Patent Publication No. 2003-323239

[Patent Document 2] Unexamined Japanese Patent Publication No. 2003-345376

[Patent Document 3] Unexamined Japanese Patent Publication No. 2003-348390

[Non-Patent Document 1] "About IrDA", Special Interest Groups or SIGs, [Online], Infrared Data Association, [Searched on Jul. 2, 2004], Internet <URL: http://www.irda.org/displaycommon.cfm?an=1>

DISCLOSURE OF THE INVENTION

Problem to be Solved by the Invention

To extract necessary information from the optical beacons, the system disclosed in Patent Document 1 requires an image sensor that can operate much faster than those used in normal imaging apparatuses. It is technically feasible to use a high-speed CMOS (complementary metal-oxide semiconductor) image sensor to perform the aforementioned high-speed operation. However, when it is operated at high speed, the image sensor consumes a large amount of electric power. Therefore, it is impractical to incorporate such a mechanism into mobile phones or other small-size information terminal devices.

The present invention intends to solve such a problem, and one of its main objectives is to provide an information-processing system having an information terminal to be operated by a user's hand to collect predetermined items of information from each of two or more communication nodes remote from the information terminal, using free-space optical communication techniques, in which the data-collecting process consumes such a small amount of power that makes the system particularly suitable for mobile information terminals.

Another objective of the present invention is to provide a free-space optical communication system for carrying out optical communications between a user device, such as an information terminal to be operated by a user's hand, and one of two or more devices remote from the user device, in which the devices can be easily positioned to establish a communication link for optical communication and any displacement due to hand movement and other reasons can be corrected to maintain the communication in stable condition.

Means for Solving the Problems

To solve the above-described problems, the present invention provides an information-processing system including an information-collecting apparatus and one or more communication nodes, where the information-collecting apparatus collects predetermined items of information from each of the remote communication node or nodes through free-space optical communication, in which:

each of the communication node or nodes includes:
a signal generator for producing a pilot signal having a predetermined frequency onto which an identification signal containing the aforementioned items of information, whose frequency is higher than that of the pilot signal, is superimposed; and
a light transmitter for emitting light containing the signal produced by the signal generator as information,
and the information-collecting apparatus includes:
an image capturer having an imaging device with a two-dimensional array of a large number of micro photo-receiving elements;
a position recognizer for detecting the pilot signal from the optical signal coming from each communication node within a two-dimensional image captured by the image capturer and for recognizing the position of each communication node within the image; and
an identification information acquirer for selectively reading detection signals produced by micro photo-receiving elements located at or close to each communication node recognized by the position recognizer in the image capturer, where the speed of reading the detection signals is higher than that of capturing the two-dimensional image, and for acquiring the aforementioned items of information of each communication node located within the captured image on the basis of the signals read out.

In a typical mode of the present invention, the information-collecting apparatus is an information terminal to be operated by a user's hand, and the identification signal superimposed by the signal generator of each communication node minimally contains, as one of the aforementioned items of information, identification information by which the communication node can be identified.

In the present construction, an operator (user) orients an information terminal by hand to a desired communication node and captures two-dimensional images with the image capturer. If the communication nodes are located close to each other, not only the desired communication node but also one or more of the other nodes will be captured in the image. Each of the communication nodes are emitting a beam of light spreading over a wide angle, containing the pilot signal and the identification signal as information. Therefore, the information terminal may simultaneously receive multiple beams of light from different communication nodes. From these optical signals coming from the communication nodes located within the imaging range of the image capturer, the position recognizer recognizes the pilot signals within the captured image. Since the pilot signals have a low frequency (e.g. 30 Hz or lower), it is possible to detect those signals at a frequency as low as the frame rate of normal imaging devices. The pilot signals do not contain any information that can be used for identifying each communication node. It should be noted that a foreign light source emitting a beam of light blinking at a frequency equal or close to that of the pilot signal could be mistakenly detected as a communication node.

After the positions of the communication nodes (and any similar light-emitting sources) are detected from the pilot signals, the identification information acquirer obtains identification information of each communication node. In contrast to the above-described process of detecting the pilot signals, in which the detection signals are read from all the micro photo-receiving elements (pixels) of the imaging device, the present process reads detection signals from only a small number of photo-receiving elements within a limited range including the position of each of the communication nodes indicated by the pilot signals. Since the number of pixels to be read is much smaller than in the case of reading all the pixels, the rate of repeatedly reading the same pixel can be set higher. Therefore, it is possible to acquire the identification signal transmitted within a frequency band higher than the frequency of the pilot signal. The identification signal contains identification information, such as an identification number uniquely assigned to every communication node. From this information, it is possible to determine whether the signal source indicated by each pilot signal is actually a communication node or something else. The identification information can also be used to specify a communication node. This information enables users to select a desired communication node, as described later.

As explained above, only a limited range of pixels are selected as the target pixels in the signal-reading process. Therefore, even if the readout rate is set higher than the normal image-capturing rate, the power consumption of the image capturer is considerably suppressed in comparison to the case where all the pixels are read at the higher rate.

Effect of the Invention

The information-processing system according to the present invention can correctly obtain identification information of each of one or more communication nodes present in the real space in front of the user, while suppressing the power consumption of the imaging device and other elements of the information-collecting apparatus, such as an information terminal. Using the obtained information, it is possible to select a desired communication node and establish a communication link between the information terminal and the selected communication node to carry out communications using light or radio waves. The identification information of a communication node can also be used to retrieve information relating to that communication node from the information terminal or another server that can communicate with the information terminal.

In an embodiment of the information-processing system according to the present invention, the identification information acquirer gradually reduces the size of the range within which it selectively reads out pixel signals produced by the micro photo-receiving elements located at or close to each position on the image recognized by the position recognizer in the image-capturer, until it finds one or more pixels from which the identification information of each communication node can be obtained.

This construction makes it possible to quickly and assuredly select those pixels from which the identification information carried by the light coming from the communication node can be obtained in the best condition while suppressing the power consumption of the imaging device.

In the above construction, the identification information acquirer may be preferably constructed so that, in the process of acquiring signals from one or more pixels from which the identification information of each communication node can be obtained, it specifies auxiliary pixels around the central pixel and reduces or corrects an effect of a hand movement by using the signals read out from the auxiliary pixels.

More specifically, the detection signals of one or more central pixels and those of the auxiliary pixels surrounding the central pixels over a predetermined range may be smoothed so that a motion of the optimal light-receiving point due to a hand movement is allowed within the aforementioned range or the motion of the optimal light-receiving point may be traced by reading out all the pixel signals within the aforementioned range at high speed. According to this technique, the identification information can be assuredly obtained from the optical signal coming from the communication node even if the information terminal moves or shakes due to a hand movement.

In an embodiment of the information-processing system according to the present invention, the information terminal further includes:

a memory for holding identification information of the communication node and additional information associated with the identification information according to necessity at least for a predetermined period of time after the communication node concerned has exited from the imaging range of the image capturer; and a process restorer for bringing the process back to the condition present immediately before the communication node concerned exited from the imaging range, on the basis of the information held in the memory when the communication node concerned is found again within the imaging range.

According to this construction, even if the information terminal changes its orientation or the communication node changes its position after the identification information is obtained, if the same communication node is found again within the imaging range after a relatively short period of time, the previous process can be continued, recognizing the newly found communication node as the previous one. For example, in the case where a temporary address is assigned to each of the one or more communication nodes with reference to the inherent addresses included in the identification information retrieved from the communication nodes, the same temporary address that had been assigned to the communication node that exited the imaging range can be re-assigned to the same communication node when the node is found again within the imaging range. Thus, the continuity of the process is ensured.

In another embodiment of the information-processing system according to the present invention, the information terminal further includes:

a partial image extractor for extracting partial image information included in a range having a predetermined shape that corresponds to the shape of the communication node or includes at least a portion of the communication node from the two-dimensional image obtained with the image capturer; and an information converter for converting the partial image information extracted by the partial image extractor into an icon or symbol information equivalent to the icon on the information terminal, and the symbol information produced by the information converter is associated with the identification information of the communication node for which the symbol information has been produced.

According to this construction, a piece of information (image) acquired from the real space can be used on the graphical user interface (GUI) of the information terminal. This makes the user interface intuitively understandable and very easy to operate.

In another embodiment of the information-processing system according to the present invention, the information terminal includes:

a display device for showing the image captured by the image capturer;

a position information displayer for creating an information object indicating the position of each communication node discerned on the basis of the identification information obtained by the identification information acquirer and for showing the information object on the captured image; and a selector for allowing an operator to select one of the communication nodes by choosing one of the information objects indicating the positions of the communication nodes on the image displayed on the screen of the display device.

The information-processing system of the present embodiment shows all the communication nodes that are selectable (or available for communication) at the moment on the display screen of the information terminal in the operator's hands. On the displayed image, the operator can easily recognize the available communication nodes by sight and correctly select one of them as a target of communication through the selector. If, for example, there are two or more communication nodes available, the operator can correctly designate the desired communication node to perform a one-to-one communication or a specific process relating to that communication node.

In another embodiment of the information-processing system according to the present invention, the information terminal is capable of two-way communications with each communication node using light or radio waves and, after one of the communication nodes is selected through the selector of the information terminal, the system attempts a two-way communication between the information terminal and the selected communication node and then establishes a one-way or two-way link for one-to-one communication between them.

In this construction, while communicating with one communication node after another through the optical or radio communication as described above, the information terminal performs necessary processes, such as designating one communication node and acknowledging the receipt of signals, to finally establish a one-way or two-way link for one-to-one communication with the selected communication node. This method ensures the communication link to be established in excellent condition.

In the above-described construction, it is possible to perform a data communication using light or radio waves at a bit rate higher than that of the identification signal after the one-to-one communication link is established between the selected communication node and the information terminal.

The content of the data to be transferred through the data communication may be static image data, movie data, audio data and other kinds of data generally handled in conventional data communications.

The free-space optical communication system according to the present invention, which uses the above information-processing system, is characterized in that it performs a one-way or two-way data communication using light after the one-to-one communication link is established between the selected communication node and the information terminal, where the directivity of the aforementioned light is higher than that of the light containing the identification signal as information. The use of a high-directivity light relatively increases the strength of light received and thereby improves the signal-to-noise ratio. To prevent interference from the light containing the identification signal, it is preferable to set the frequency band of the data communication signal higher than that of the identification signal.

The aforementioned data communication using light may be in conformity to the IrDA standard. According to this construction, the pilot signal and the identification signal are sent and received through a beam of light having a low directivity (i.e. spreading over a relatively wide angle), and a communication link between the desired communication node and the information terminal is established by a simple manual operation. Then, image data, digital audio data and other kinds of data having relatively large sizes can be transferred through a high-speed optical communication. Such a construction significantly improves the user-friendliness of the data-transferring operation between the information terminal and the communication node through the free-space optical communication.

With respect to the selection of a desired communication node through the selector in the data-transferring step, the present free-space optical communication system may be embodied so that:

an indicator for selecting one of the communication nodes is displayed on the screen of the display device; and the axis of the communication light emitted from the information terminal is adjusted at the object indicated by the indicator.

According to this construction, when the user selects one of the communication nodes, the axis of the light emitted from the information terminal to the selected communication node is adjusted. Therefore, at least the information terminal does not need to have a mechanism for mechanically adjusting the optical axis. As a result, the construction is simplified and the production cost of the system is reduced. The operator can intuitively select the communication node by sight. Thus, the system becomes very user-friendly.

BRIEF DESCRIPTION OF THE DRAWINGS

FIG. 1 is a schematic diagram showing a mode of using the free-space optical communication system according to an embodiment of the present invention.

FIGS. 2(a) and 2(b) are radiance distribution charts showing the difference in directivity between the data light and the ID light used in the free-space optical communication system according to the present embodiment.

FIGS. 13(a) and 13(b) are conceptual diagrams showing modes of communication between the information terminal and each information devices in the remote control system shown in FIG. 12.

FIG. 14 is a drawing illustrating two modes of start-up sequences of the remote control system in FIG. 12.

BEST MODE FOR CARRYING OUT THE INVENTION

An embodiment of the free-space optical communication system using an information-processing system according to the present invention is described in detail, with reference to the attached drawings.

FIG. 1 is an overall schematic diagram showing a mode of using the free-space optical communication system according to the present embodiment. In this example, the mobile phone 1, which is hand-held by an operator, corresponds to the information terminal of the present invention and is capable of free-space optical communication. The personal computer 2, the digital camera 3 and the portable music player 4, which are located relatively close to each other, are communication nodes capable of two-way communication with the mobile phone 1. The mobile phone 1, the personal computer 2, the digital camera 3 and the portable music player 4 each emit a beam of light containing an ID signal as information (this light called the "ID light" hereinafter). The above-listed devices also emit another beam of light containing image data, audio data or other kinds of data signals as information (this light called the "data light" hereinafter).

Figure 3:
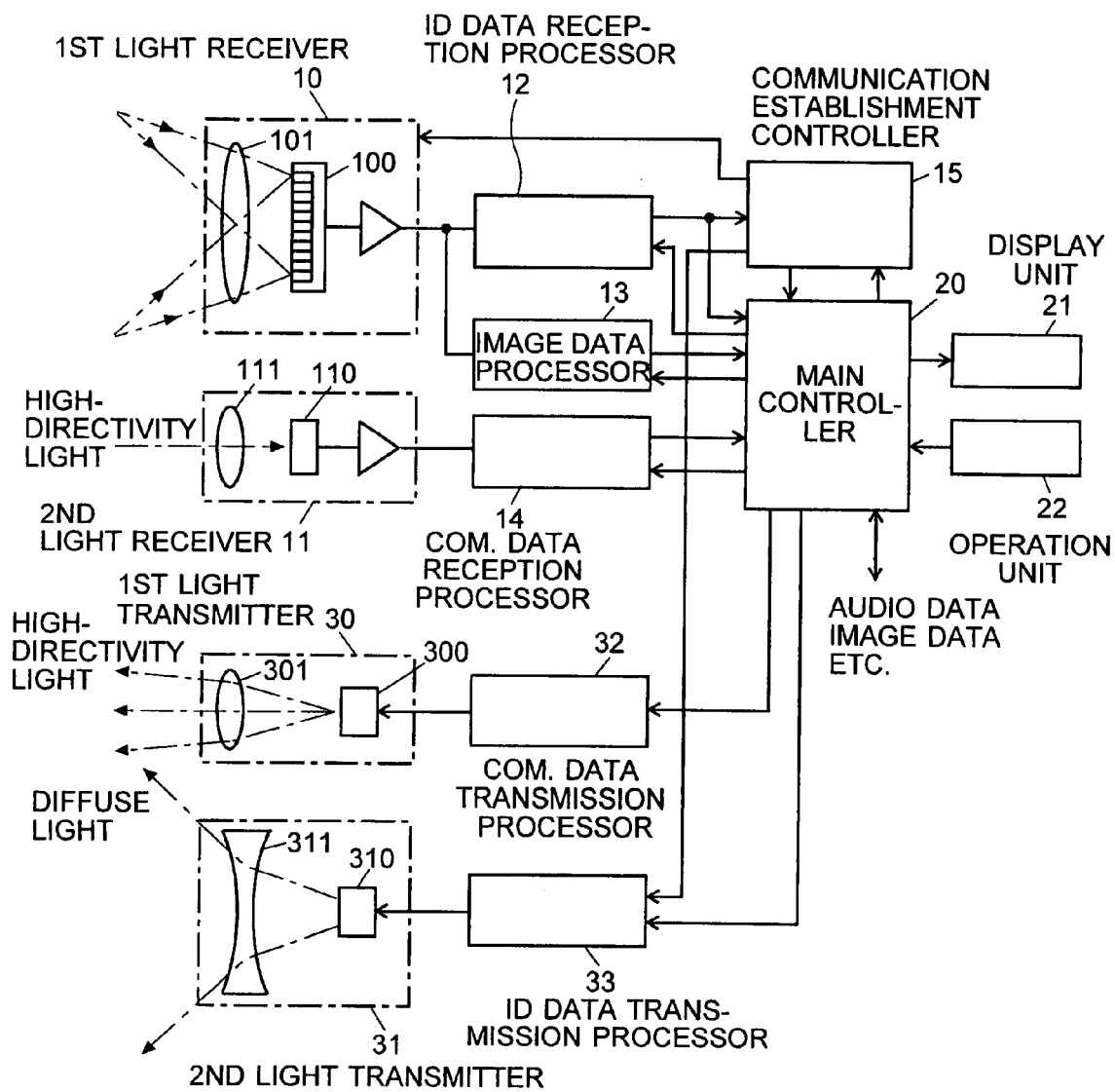
FIG. 3 is a block diagram showing the construction of the main section of the communication terminal used in the free-space optical communication system according to the present embodiment, where the aforementioned section is dedicated to the optical communication.

FIG. 3 is a block diagram showing the main components built into the mobile phone 1. These components carry out the optical communication characteristic of the present embodiment. The mobile phone 1 has a light-transmitting section including a first light transmitter 30 and a second light transmitter 31. The first light transmitter 30, which includes a light source 300 (e.g. a light-emitting diode) and a lens 301 for spreading light over a narrow angle, is an optical system for emitting light having a high directivity. The second light transmitter 31, which includes a light source 310 (e.g. a light-emitting diode) and a lens 311 for spreading light over a wide angle, is an optical system for emitting diffuse light. The mobile phone 1 also has a light-receiving section including a first light-receiver 10 and a second light-receiver 11. The first light-receiver 10, including a light-receiving lens 101 and an image sensor 100 as the imaging device, is an optical system for imaging. The second light-receiver 11, including a light-receiving lens 111 and a light-receiving device 110, is an optical system for data communication. The image sensor 100 has a two-dimensional array of micro photo-receiving elements, an example of which is a CMOS image sensor. The light source 300 of the first light-transmitter 30 and the light source 310 of the second light-transmitter 31 may be aggregated into a single device. Similarly, the image sensor 100 of the first light-receiver 10 and the light-receiving device 110 of the second light-receiver 11 may be aggregated into a single device.

The electrical circuit includes the following components:

an image data processor 13 for creating a two-dimensional image from the signals (pixel signals) read out from the micro photo-receiving elements of the image sensor 100;

an ID data reception processor 12 for extracting ID (identification) information by performing data-decoding and other operations on the signals (pixel signals) read out from the micro photo-receiving elements of the image sensor 100;

a communication data reception processor 14 for extracting desired data by performing data-decoding and other operations on the detection signals generated by the light-receiving device 110;

a communication establishment controller 15 for performing various processes to establish a one-to-one communication between the information terminal and the communication nodes on the basis of the signals obtained by the ID data reception processor 12;

a main controller 20 for performing various control operations and processes relating to the communication;

an operation unit 22 and a display unit 21, both being connected to the main controller 20;

a communication data transmission processor 32 for modulating a given data and driving the light source 300 under the control of the main controller 20; and an ID data transmission processor 33 for modulating a given ID data and driving the light source 310 under the control of the main controller 20 and the communication establishment controller 15.

Though the optical and electric systems of each communication node are basically the same as those of the mobile phone described above, there are some differences in their processing functions. These differences result from the essential fact that the information terminal functions as the master device to be directly operated by the user during the communication, whereas the communication nodes function as the slave devices that will not be directly operated by the user during the communication. This point will be detailed later.

FIG. 2(a) is a radiance distribution chart showing the difference in directivity between the data light emitted from the first light transmitter 30 and the ID light emitted from the second light transmitter 31. The ID light is a diffused light and covers a wide angle, as shown in the figure. Such a light is unsuitable for high-speed data transmission because the strength of diffuse light on the receiver side cannot be easily increased. In contrast, the data light is a high-directivity light, which covers only a narrow angle. However, its data transmission speed can be raised by relatively increasing the strength of the light on the receiver side. In the present embodiment, there are two separate light sources whose light partially overlap each other, as shown in FIG. 2(a). Alternatively, it is also possible to regulate their directivity by an appropriately deformed lens to emit a single ray of light containing both the high-directivity light and the diffuse light from the same light transmitter, as shown in FIG. 2(b). In both cases of FIGS. 2(a) and 2(b), the axes of the high-directivity light and the diffuse light should maximally coincide with each other.

Figure 4:
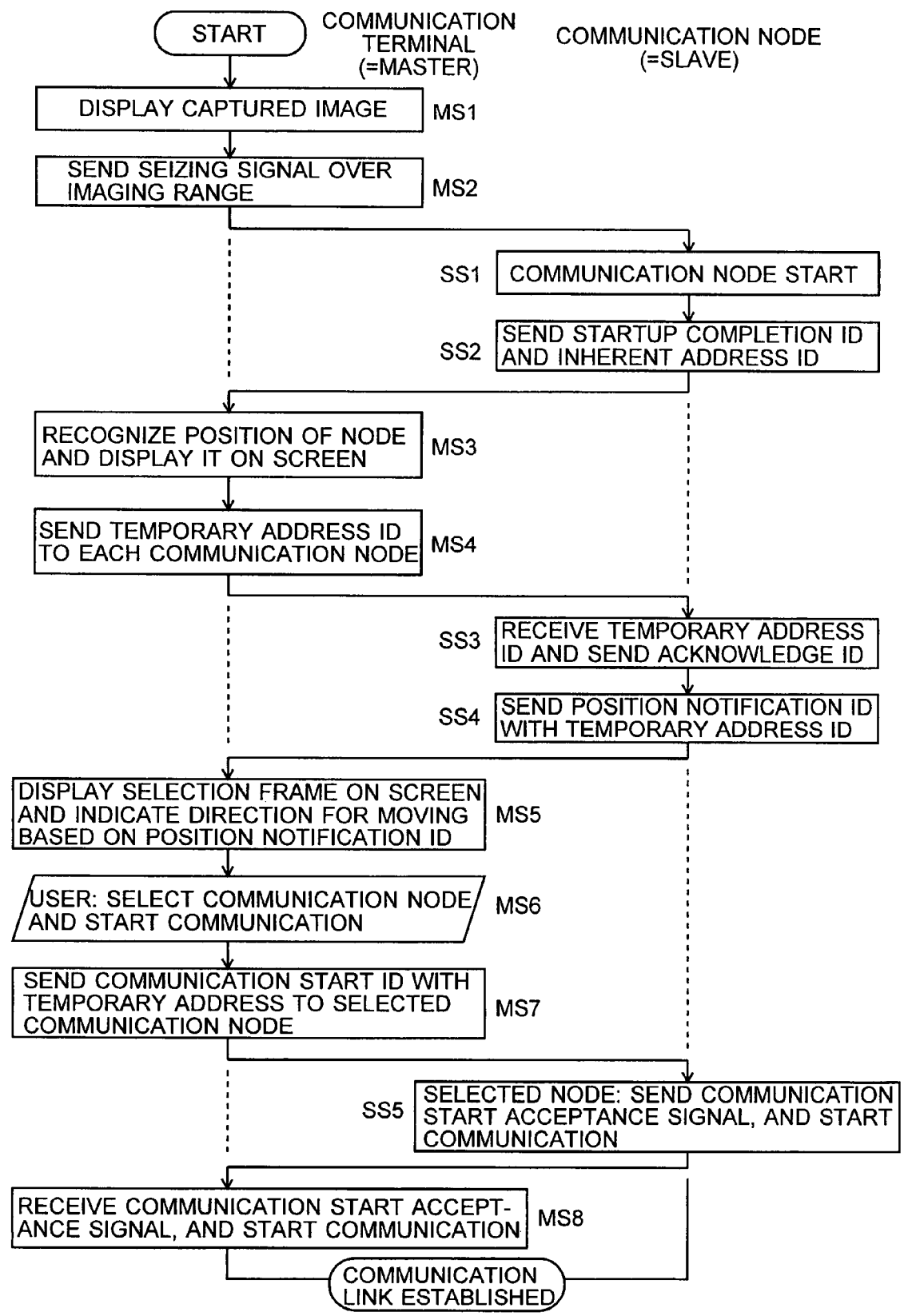
FIG. 4 is a flowchart showing the steps of establishing the communication link in free-space optical communication system according to the present embodiment.

With reference to the flow chart of FIG. 4, the following paragraphs describe the process of establishing a communication link for optical data communication between the mobile phone 1 as the information terminal and one of the communication nodes in the free-space optical communication system of the present embodiment.

The operator directs the camera (i.e. the first light receiver 10) to the desired communication node and performs a predetermined operation on the operation unit 22 to display an image of a range within which the desired communication node is present on the display unit 21 (Step MS1). This operation is the same as performed when the user wants to have a desired object displayed on the screen of the display unit 21 of a conventional camera-equipped mobile phone. When the camera of the mobile phone 1 is directed to the position where the communication node is present, a captured image is displayed on the screen of the display unit 21. FIG. 5(a) shows an example of the captured image. In this state, under the control of the main controller 20, the ID data transmission processor 33 sends a seizing signal from the second light transmitter 31 (Step MS2). Then, the seizing signal is radiated over a wide range of the space displayed on the screen of the display unit 21.

In the present case, every communication node is in a sleep mode, waiting for a seizing signal. Upon receiving the seizing signal, each communication node starts its operation (Step SS1). After the startup, the communication node sends an ID light carrying a startup completion signal and an inherent address pre-assigned to each communication node (Step SS2). The ID light emitted from each communication node is a diffuse light, so that it can reach the position where the mobile phone 1 is present. The inherent address has a long bit length, like the IPv6 address, and is uniquely assigned to each communication node. It is optional that the communication nodes are initially in a sleep mode; it is allowable for the communication nodes to be always in the activated state while its power is on. In that case, Steps MS2 and SS1 can be omitted. Since the positions of the communication nodes are already recognizable at the moment of capturing the image with the camera of the mobile phone 1, it is possible to incorporate the process of Step MS1 into the process of Step MS3 to be described later.

The mobile phone 1 recognizes the position of each communication node on the basis of the information contained in the ID light received from each communication node. This recognition process includes some characteristic operations as detailed below.

Figure 8:
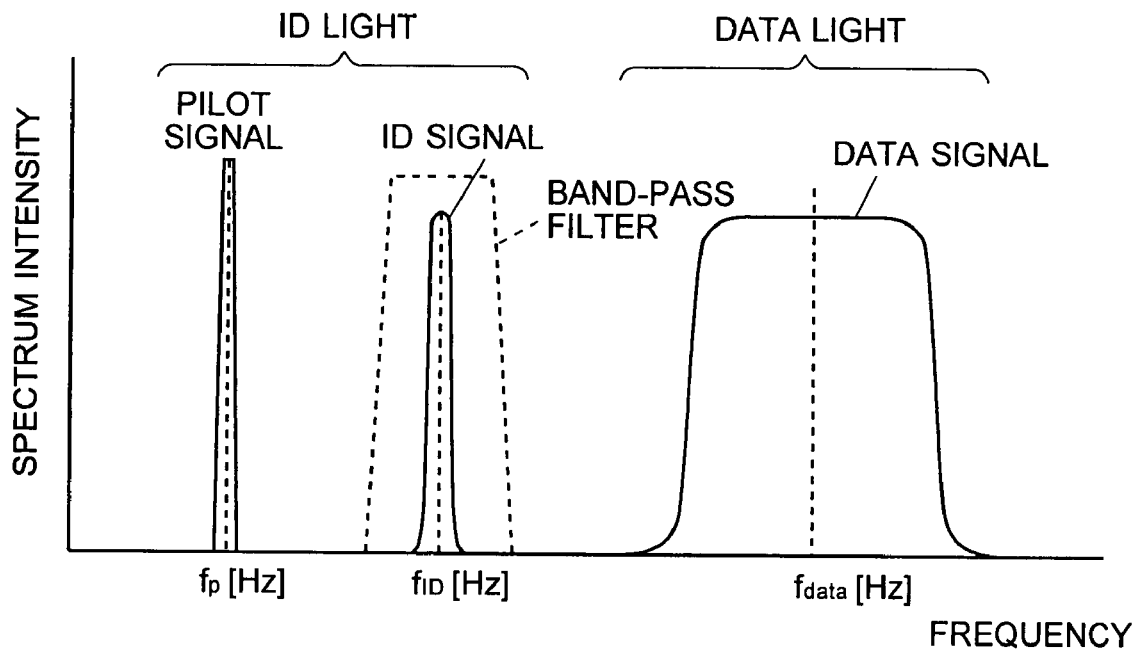
FIG. 8 is a graph showing the frequency band of each kind of signal contained in the light emitted from the communication node in the free-space optical communication system according to the present embodiment.

FIG. 8 is a graph showing the frequency bands of the signals contained in the light (ID light and data light) emitted from the communication nodes in the present system. The pilot signal and the ID signal are carried by the ID light, and the data signal is carried by the data light. The pilot signal is a signal that blinks (or changes its strength) at a frequency of $f_p$, which is lower than a half of the frame frequency (30 or 60 Hz) of the image sensor. This signal is common to all the communication nodes. The main function of the pilot signal is to make the positions of the communication nodes recognizable to the counterpart of the communication, i.e. the information terminal (or mobile phone 1 in the present case).

The ID signal has a frequency band with the central frequency $f_{ID}$ of about 1 kHz, which is higher than the frequency $f_p$ of the pilot signal. The ID signal contains various items of information, including the aforementioned inherent address and the startup completion signal. Basically, this ID signal does not contain audio data, image data or other data that is the most essential content to be transferred (the low transmission rate of the ID signal impedes the transfer of such large-size data). The main purpose of the pilot signal is to send and receive information necessary for establishing a communication link for data transmission. Thus, the data signal has a higher and broader frequency band. In summary, the frequency bands of the pilot signal, the ID data and the communication data are clearly separate from each other. Therefore, even if these signals coexist, each signal can be separately extracted on the receiver side.

Figure 7:
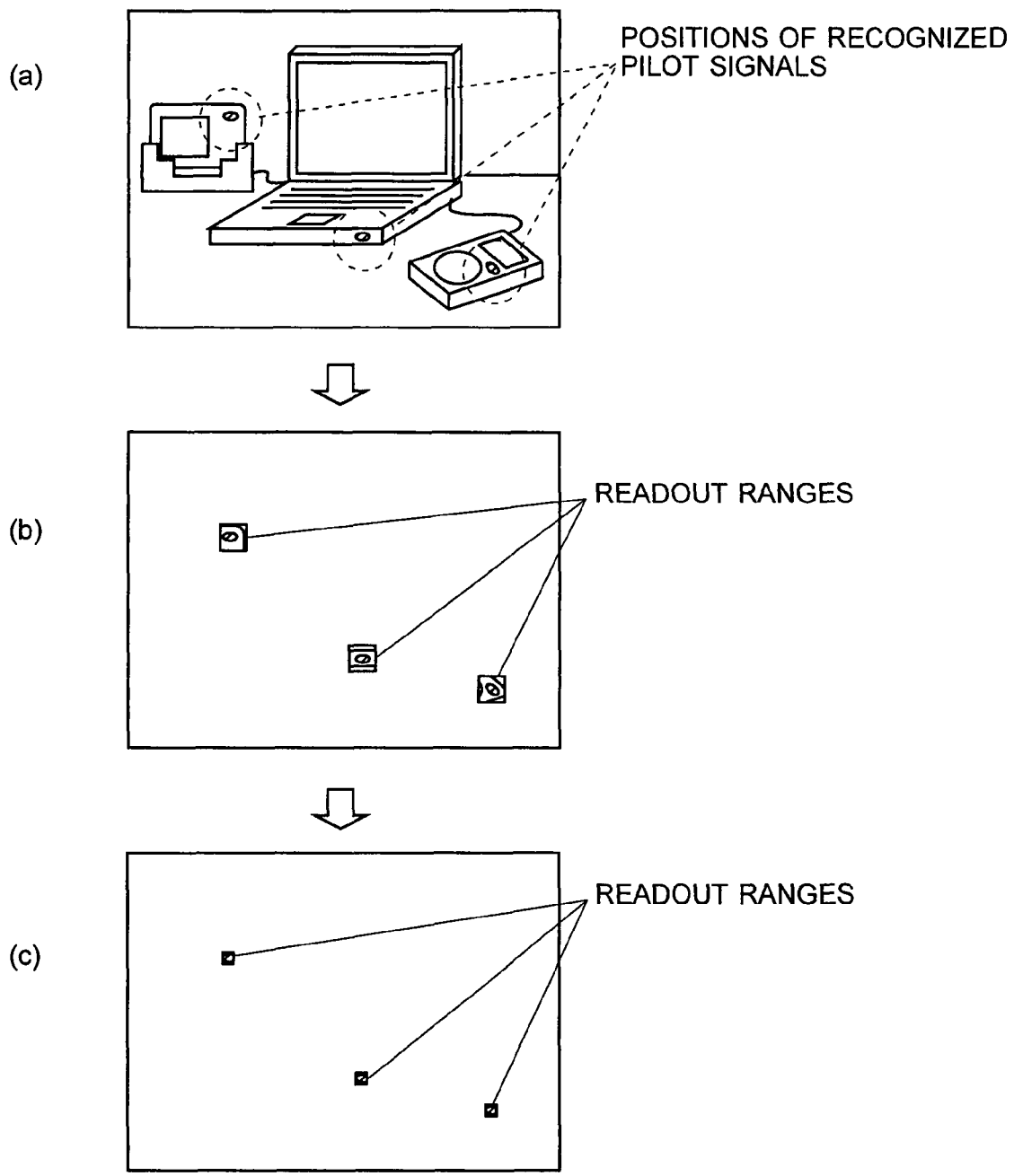
FIG. 7 schematically illustrates the control method for reading the ID data in the free-space optical communication system according to the present embodiment.

As stated earlier, in Step SS2, every communication node simultaneously emits an ID light containing the startup completion signal and the inherent address as information. This ID light also contains the aforementioned pilot signal. On the screen of the display unit 21 of the mobile phone 1, an image as shown in FIG. 7(*a*) is displayed. The rays of ID light emitted from the light transmitters of at least the PC 2, the digital camera 3 and the music player 4 present in the displayed image enter the first light receiver 10 of the mobile phone 1 and are detected by the image sensor 100. The image data processor 13 repeatedly reads out all the pixel signals of the image sensor 100 at a frame frequency of 30 Hz, while the pilot signal is blinking at a frequency equal to or lower than a half of the frame frequency. Therefore, the main controller 20 can detect the pilot signal by taking the difference between temporally continuous images or by performing a frequency filtering operation on each pixel. In the present example, the pilot signals will be detected at the positions indicated by the broken lines in FIG. 7(*a*). It should be noted that, if there is another light source blinking at approximately the same frequency, that light source would be mistakenly recognized as a pilot signal.

The next step is to extract the ID data from the pixel signals. In this step, the signals are read out from only a limited range of pixels surrounding each position at which the presence of the pilot signal has been recognized, so that the readout speed can be set higher. This step uses a method called hierarchical selection. The communication establishment controller 15 receives, from the main controller 20, information about the pixel positions at which the pilot signal has been detected and sets a readout range of a predetermined size around each of the aforementioned positions. The ID data reception processor 12 reads out signals from only the pixels within the aforementioned ranges at a rate higher than the frame rate of reading the full screen. For example, first, readout ranges having a relatively large size are set as shown in FIG. 7(*b*). Under this condition, the pixel signals are read out at a frame rate of about 240 Hz to search for smaller pixel ranges receiving the ID signals. Next, with the readout ranges further reduced as shown in FIG. 7(*c*), the pixel signals are read out at a still higher rate of about 960 Hz to search for much smaller pixel ranges receiving the ID signals. The reduction in the size of the pixel ranges to be read and the increase in the readout rate are repeated in stages until a small number of pixels at which the ID signals are detected in the best condition are found. Then, the signals read out from those pixels are decoded to obtain the ID signals. The reduction in the number of readout pixels in accordance with the increase in the readout speed prevents an increase in the power consumption of the image sensor 100.

Figure 9:
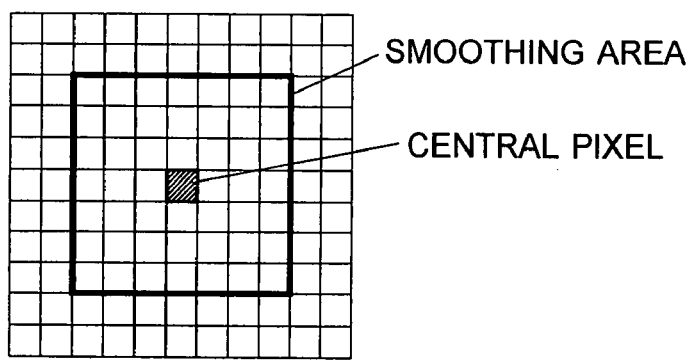
FIG. 9 schematically illustrates the method of image stabilization in the free-space optical communication system according to the present embodiment.

To carry out a hand movement correction process as follows, not only the detection signal of one pixel at which the ID signal is detected in the best condition is read out, but also other pixels within a predetermined area surrounding the aforementioned one pixel are read continuously (or at predetermined intervals of time). Since the mobile phone 1 is operated by hand of the user, its position is not perfectly fixed. Accordingly, it is necessary to take into account a subtle displacement due to an unconscious hand movement or other factors. For this purpose, as shown in FIG. 9, for example, a predetermined smoothing area is defined around the central pixel at which the ID signal is detected in the best condition on the light-receiving surface of the image sensor 100. This smoothing area corresponds to the allowable range of the positional displacement. All the signals read out from the pixels within the smoothing area (including the central pixel) are subjected to a smoothing operation, and the value thereby obtained is regarded as the signal value to be decoded. Within the smoothing area, any change in the detection point of the ID signal does not cause any problem in continuously obtaining the ID signal. It is also possible to provide the image sensor with a function of producing an output signal obtained by processing multiple signals read out from the pixels within a predetermined area.

As another method, it is possible to read out signals from the pixels surrounding the central pixel within the predetermined area and compare those signals to continuously select a new pixel at which the ID signal is detected in the best condition. According to this method, the target pixel for the decoding process changes in accordance with the hand movement.

Figure 5:
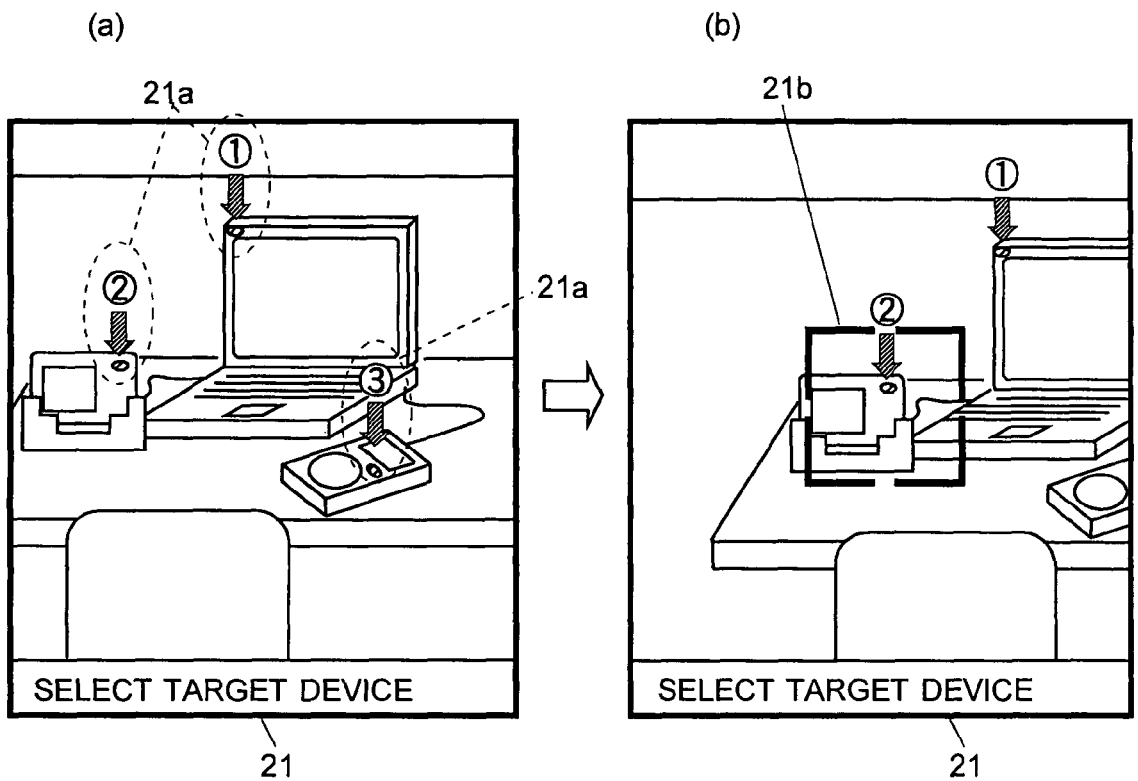
FIG. 5 schematically illustrates the process of selecting a communication node in the free-space optical communication system according to the present embodiment.

If another blinking light source like a pilot signal is present within the image, the light source may be mistakenly recognized as a pilot signal, as explained earlier. However, no ID data can be obtained from the light coming from such a light source. Thus, it is possible to check the wrong recognition. From the regular communication nodes (PC 2, digital camera 3 and potable music player 4 in the present embodiment), ID data are received and ID addresses and other information are checked. After the position of each communication node on the captured image is determined, the main controller 20 displays an arrow 21*a* indicating that position with a serial number ((1), (2) or (3) in the present case) on the captured image (Step MS3), as shown in FIG. 5(*a*). If the size of the ID light source is too large or the ID light is reflected by surrounding objects, the same ID light may be detected at multiple, separate areas on the captured image. However, since the system requirement disallows the presence of multiple communication nodes having the same ID light, the aforementioned separate areas are regarded as an integral set of areas having the same ID. Thus, the system avoids the situation where multiple communication nodes having the same ID are displayed on the screen of the display unit 21.

Then, the ID data transmission processor 33 is controlled to produce a series of light rays each containing an ID data including the received inherent addresses coupled with a temporary address to be assigned to each communication node. This light is emitted as a diffuse light from the second light transmitter 31 (Step MS4). Assigning a temporary address of a shorter bit length (e.g. 8 or 16 bits) to each communication node reduces the traffic of the data communication; as explained earlier, the inherent address has a long bit length and takes an accordingly long time to be transmitted.

Each communication node examines the ID data contained in the ID light it has received and determines whether or not the ID light is addressed to it by checking whether the ID light contains its inherent address. Upon receiving an ID data addressed to it, the communication node extracts the temporary address from the ID data and sends an ID light as an acknowledge signal indicative of the receipt of the temporary address (Step SS3). Subsequently, the temporary addresses are used to identify each of the communication nodes until the communication is discontinued. If an inconsistency of the temporary addresses or some other error has occurred, the temporary addresses can be reissued on the basis of the inherent addresses. It is also possible to perform an error check on the basis of the inherent addresses at predetermined intervals of time.

Each communication node transmits an ID light containing a position notification signal in addition to the temporary address (Step SS4). The position notification signal is used for the following reason: In the data communication using a high-directivity light, the communication node selected as the target of the communication is required to be on or in the vicinity of the optical axis of the first light transmitter 30 of the mobile phone 1. Similarly, the mobile phone 1 needs to be on or in the vicinity of the optical axis of the light transmitter for data communication of the communication node on the counterpart side. In the former case of the optical axis adjustment, the operator needs only to manually change the orientation or position of the mobile phone 1. In the latter case, if the communication node does not have a mechanism for automatically adjusting its optical axis (i.e. a mechanism for changing the light-emitting direction of the light transmitter), the operator holding the mobile phone 1 needs to move so that he or she comes onto the optical axis of the target device. However, the operator cannot exactly find where he or she should go. The position notification signal is used to give such information.

Figure 6:
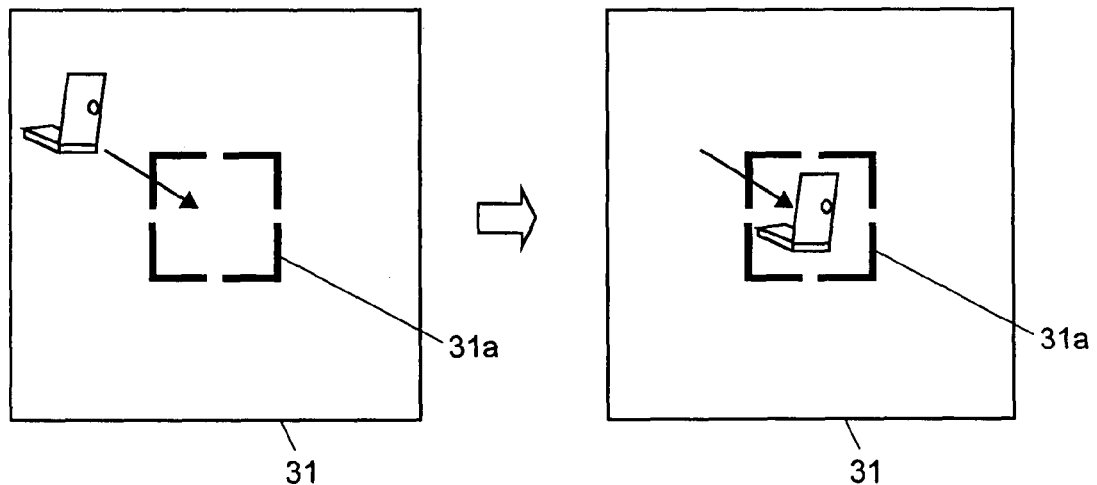
FIG. 6 schematically illustrates the method for adjusting the optical axis in the free-space optical communication system according to the present embodiment.

That is, each communication node has a pseudo display area on which a frame 41a indicating the position at which the optical axis coincide with the captured two-dimensional image 41 is displayed, as shown in FIG. 6(a). The word "pseudo" hereby means that such a display area does not actually exist; it is an internal recognition function that corresponds to such a viewing area. On this display area, the position of the mobile phone 1 as the counterpart of the communication is recognized. Then, its positional relationship with respect to the frame 41a is recognized, and the direction for moving the mobile phone 1 into the frame 41a is determined. This moving direction is translated into information corresponding to the actual direction to which the mobile phone 1 should be moved. This information is used as the position notification signal.

In the mobile phone 1, upon recognizing the receipt of an acknowledgement signal or position notification signal from each communication node, the communication establishment controller 15 displays a node selection frame 21b at the center of the screen of the display unit 21, as shown in FIG. 2(b). The operator changes the orientation or position of the mobile phone 1 so that the communication node to be selected as the target device from the communication nodes displayed on the screen will enter the node selection frame 21b. In the example shown in FIG. 2(b), the digital camera 3 is being selected as the target device. In addition, on the basis of the position notification signal received from the communication node inside the node selection frame 21b, a piece of information indicative of the direction to which the mobile phone (or the operator) should move is displayed on the screen (Step MS5). According to this indication, the operator changes his or her position. Thus, the optical axis of the data light emitted from the communication node is adjusted, as shown in FIG. 6(b).

When the desired communication node is enclosed in the node selection frame 21b, if a predetermined button operation for finally designating the communication node is performed on the operation unit 22, the selection of the communication node is settled (Step MS6). For example, if the operator performs the node-designating operation in the state shown in FIG. 2(b), the digital camera 3 will be chosen as the target device for one-to-one communication. Since the communication node inside the node selection frame 21b is correctly on the optical axis of the first light transmitter 30, the optical axes of the data lights between the mobile phone 1 and the desired communication node coincide with each other after the above operation.

After the communication node is selected, the mobile phone 1 sends the communication node an ID light containing its temporary address and a communication start signal (Step MS7). Though this ID light also reaches the other communication nodes, these nodes do nothing because they can immediately determine that the signal is not addressed to them by checking the temporary address contained in the signal. Therefore, only the communication node selected as the target actually receives the communication start signal. In response to this signal, the selected communication node returns a communication start acceptance signal (Step SS5). Now the communication node is ready for a high-speed data communication with the mobile phone 1. After receiving the communication start acceptance signal, the mobile phone 1 is ready for the high-speed data communication with the selected communication node (Step MS8). Thus, a communication link for the data communication between the mobile phone 1 and the selected communication node (i.e. the digital camera 3 in the present case) is established. Through this link, the data communication is started according to predetermined rules.

Figure 10:
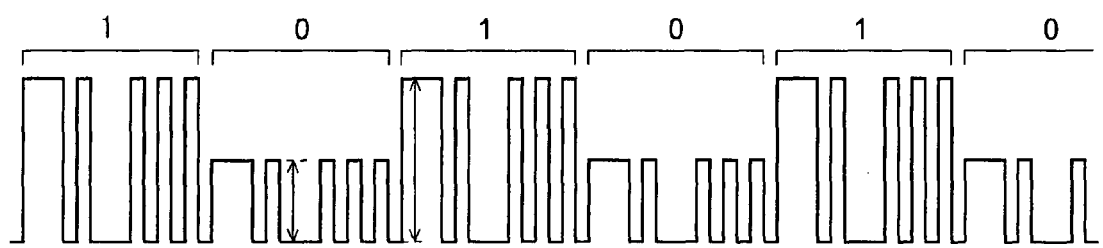
FIG. 10 illustrates another method of superimposing the ID data on the communication data in the free-space optical communication system according to the present embodiment.
Figure 11:
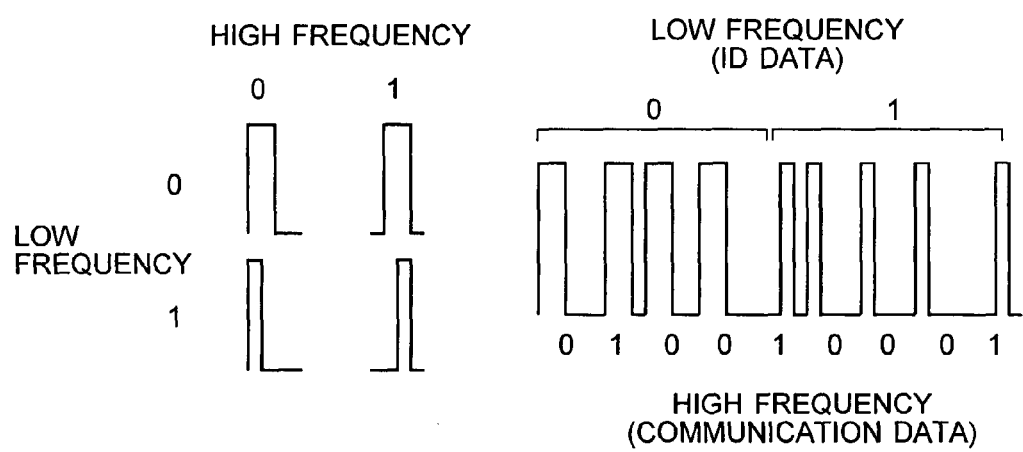
FIG. 11 illustrates another method of superimposing the ID data on the communication data in the free-space optical communication system according to the present embodiment.

The embodiment described thus far can be modified in various forms. For example, in the previous embodiment, the frequency bands of the ID data and the communication data are perfectly separated from each other so that they can be superimposed on each other. It is possible to use a different method for superimposing the two kinds of data. FIGS. 10 and 11 illustrates examples of such methods.

In the example shown in FIG. 10, a carrier signal having a predetermined frequency is modulated in the frequency domain to convey one data having a relatively high frequency (pulse width modulation or pulse frequency modulation) and the same carrier signal is also amplitude-modulated to convey other data having a relatively low frequency. For example, the carrier signal may initially carry a frequency-modulated ID data and an amplitude-modulated pilot signal. Then, after the data communication is started, it may carry a frequency-modulated communication data and an amplitude-modulated ID data. In the example shown in FIG. 11, the communication data is modulated by phase shift keying, which expresses 0 and 1 by changing the phase of the pulse signal. Then, the ID data is superimposed on the pulse signal by changing the pulse width by selecting whether or not the pulse signal is made to pass a low-pass filter (or band-pass filter) having a certain time constant. Methods other than described thus far can be also used.

In the previous embodiment, the emitting direction of the data communication light is fixed. As another example, it is possible to provide a mechanism for automatically adjusting the optical axis using a micro mirror actuated by a micro electro mechanical system (MEMS) device or similar elements to change the light-emitting direction at high speed.

In the system constructed as in the previous embodiment, it is possible that the direction of the mobile phone 1 is temporarily changed during the ID communication or data communication, making the target communication node exit from the captured image. According to circumstances, the communication node itself may move and exit from the captured image. If the target communication node is outside the captured image for a considerably long period of time, it is probable that the communication has been discontinued. If the target communication node is outside the captured image for only a few seconds and then back into the captured image, it is probable that the operator intends to continue the communication. With these considerations, it is preferable to keep the ID data of the target communication node in a memory for a predetermined period of time even after the ID light of that communication node has disappeared from the captured image. When the same communication node is found again in the captured image within the aforementioned period of time, the operation can be restored so that the same process can be continued from the state present immediately before the disappearance of the target node. More specifically, using the same temporary address as used before the disappearance, the communication can be restarted from a point in time where the communication was discontinued or another point in time slightly earlier than that. It is of course possible to also memorize the relationship between the temporary address and the inherent address and other related information in addition to the ID data, according to necessity.

In the previous embodiment, after the communication link is established using the ID data, the optical communication using the data light is performed to transmit the main content data. It is also possible to perform the data communication by a technique different from the optical communication. For example, a communication technique using radio waves, such as a wireless local area network (LAN) or Bluetooth™, may be used for the data communication, while the free-space optical communication system described earlier is used to obtain preliminary information (e.g. inherent addresses) necessary for the data communication.

For example, the system shown in FIG. 1 may be constructed so that the mobile phone 1 as the information terminal, the PC 2, the digital camera 3 and the music player 4 as the communication nodes each emit an ID light containing an ID signal as information and also radio waves in conformity to a predetermined format (or standard) containing data signals, such as image data or audio data. After the communication link is established as shown in the flowchart of FIG. 4, the data communication is carried out using radio waves instead of light. Since the data communication does not use light in the present case, the component for sending and receiving the high-directivity light is unnecessary, instead of which functional components for radio-wave communication are required.

Furthermore, in the case where the system is provided with the functions for radio-wave communication, it is advantageous to use those functions for a portion of the ID data transmission process as well as the data communication. For example, in the flowchart shown in FIG. 4, the transmission of the inherent address from each communication node to the mobile phone in Step SS2 should use the free-space optical communication, whereas the communications in the subsequent steps of SS4, SS3, SS4, MS7, SS5 and MS8 may be radio-wave communications. In other words, the free-space optical communication is used when the information terminal collects the identification information, i.e. the inherent address, of each communication node. Subsequently, the system is switched to the radio-wave communication mode, which is not affected by the orientation of the mobile phone. Such a method improves the user-friendliness of the system.

In a mode of the information-processing system and the free-space optical communication system described thus far, a power indicator (LED) for indicating the power on/off state or other light-emitting elements originally included in many domestic appliances and information devices is used as the light source of the communication node for emitting the data light or ID light, instead of a dedicated light source. According to this construction, the external construction of the appliances can be the same as that of conventional ones; what is required is only to add internal circuits. It is also possible to use an LED device having a visible LED and an additional infrared LED enclosed in one package. The pilot signal may be a visible light instead of an infrared light. In that case, the light should have a frequency at which the light minimally flickers to the human eye.

To further improve the user-friendliness, it is preferable to create a GUI environment on the mobile phone so that various operations can be completed using icons. For example, the icons can be created from the captured image as shown in FIG. 5(a) by cutting out an image of each communication node along its outline and then reducing the pixel information of the image or converting the image into a simpler figure. To enable the icon-based operations, the correspondence between the icons and the inherent or temporary addresses of the communication nodes should be memorized. In practice, exact recognition of the outlines of the communication nodes is difficult. Therefore, it is allowable to take a different, simplified approach. For example, an area having a predetermined size including the position of the ID light of the communication node may be cut out from the image. Another idea is to allow the user to specify the area for cutting the image. In addition, the communication node may provide information about the shape of the communication node or similar information that helps the cutout of the image or suggests the cutout area. Such operations as described thus far make it possible to obtain information from the real space in front of the user and freely use the information within a virtual space created in a mobile phone or similar device.

The free-space optical communication system according to the present invention can be applied to one-way optical data communication systems as well as two-way data communication systems.

Figure 12:
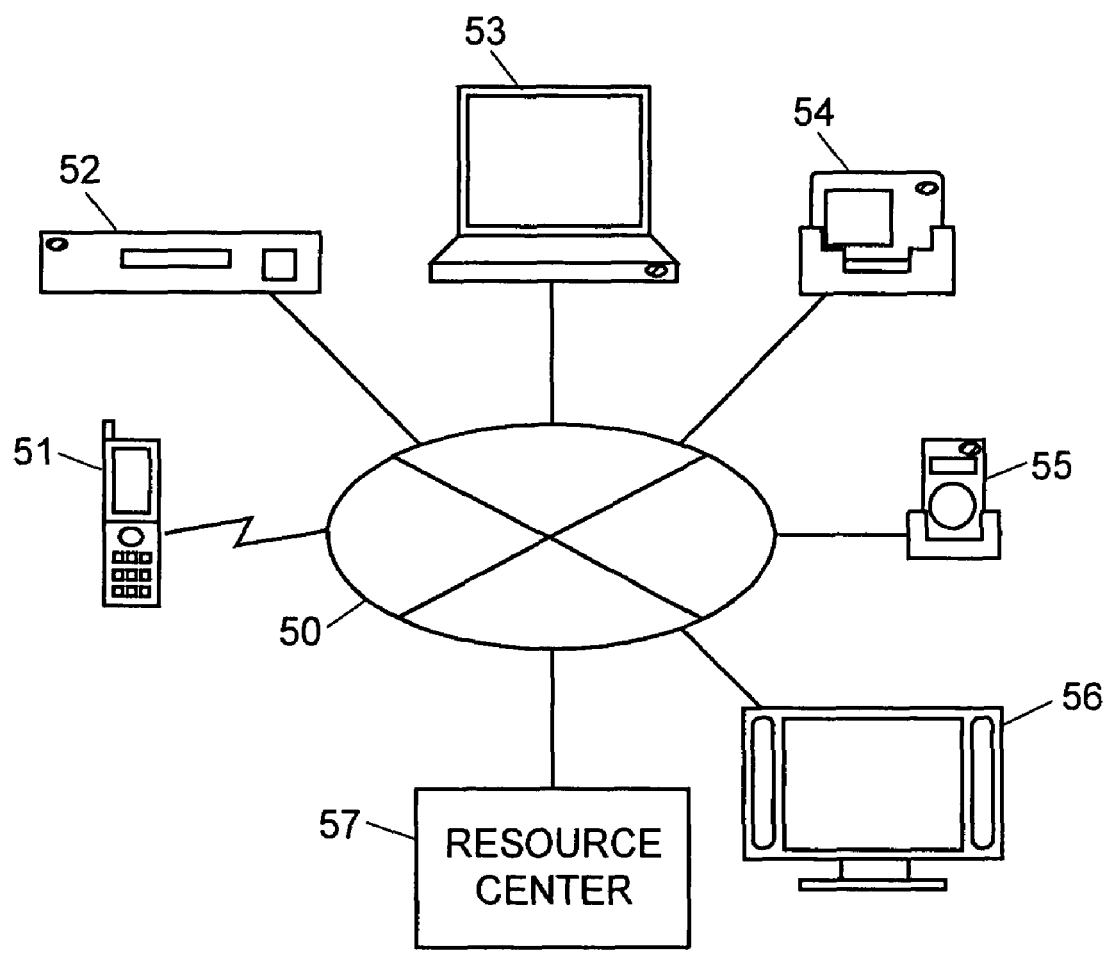
FIG. 12 is a conceptual diagram showing the overall construction of a remote control system according to another embodiment of the present invention.

Next, as another embodiment of the information-providing system according to the present invention, a domestic remote control system using a portable information terminal (which may be a mobile phone) is described with reference to FIGS. 12 to 15. FIG. 12 is a conceptual diagram showing the overall construction of an example of the remote control system. In addition to the information terminal 51 as the main component for the remote control, this system includes a DVD recorder 52, personal computer 53, digital camera 54, portable music player 55, television set 56 and other devices, all connected to a home network 50 (naturally, an external network may be used instead), and a resource center 57 is also connected to the same network 50. This network 50 can take any form as long as it allows the aforementioned devices to communicate with each other; it may or may not include a server or similar administration device that helps other devices connect to each other. The connection between the network 50 and each device may be wired or wireless. Other types of devices that are not listed above can be also controlled by the present system.

The resource center 57 holds various resources associated with each information device. The "resources" hereby include definition information of each information device, a simple image (e.g. an icon) of each information device to be displayed on a screen, a control program (typically, a Java™ application) that runs on the information terminal 51 to create a user interface for each information device and communicate with or take control of the device. The program may take the form of a behavioral description written in a programming language or a markup language. The resource center 57 may be a computer on which one or more server programs are running, or it may be simple storage media, e.g. a flash memory device (e.g. a memory card with a built-in flash memory chip).

In the system according to the present embodiment shown in FIG. 12, the DVD recorder 52, personal computer 53, digital camera 54, portable music player 55, television set 56 and other devices correspond to the communication nodes shown in FIG. 1. Each of these information devices minimally has the function of emitting an optical signal that contains a pilot signal indicating the location of the information device and an ID signal indicating the ID code of the device. Other kinds of data are transferred through the network 50 without using the free-space optical communication. The information devices can be categorized into two groups: passive and active. A passive device, denoted as "Information Device A" in FIGS. 13(a) and 13(b), is capable of receiving control signals but incapable of two-way communication of data signals. In contrast, an active device, denoted as "Information Device B", can receive control signals and also perform two-way communication of data signals (FIG. 13(b)). Both passive and active devices can send an ID signal to the information terminal (FIG. 13(a)).

As in the previous embodiment, in the remote control system of the present embodiment, it is necessary to activate each information device to establish a communication link with the information terminal 51 before the data communication can be started between them. The sequence of establishing the connection link depends on whether the counterpart is a passive or active device. FIG. 14(b) illustrates the start-up sequence for passive devices.

Initially, the information terminal 51 sends a seizing signal to the information device A (passive device) through the network 50. Upon receiving the seizing signal, the information device A emits an optical ID signal onto which a pilot signal having a lower frequency is superimposed. The information terminal 51 detects the pilot signal superimposed on the ID signal by the process described earlier. Based on this pilot signal, the information terminal 51 recognizes the position of the information device A within an imaging range of the mobile phone 41 and then receives and decodes the ID signal having a higher frequency. As explained earlier, the ID signal contains a vender identification code, product type identification code, serial number and/or other static ID information that is unique to each information device. Based on this information, the mobile phone 41 identifies the information device A and sends an inquiry to the resource center 57 through the network 50 to download resources associated with the information device A. The resources thus downloaded are stored in the internal memory. Thus, the information terminal 51 obtains the resources relating to the information device A.

The initial transmission of the seizing signal from the information terminal 51 is not always necessary. However, without the seizing signal, the passive devices need to generate optical ID signals at all times, which is a waste of power. Therefore, it is more preferable to activate the light source to generate the optical signal for the first time after the seizing signal is received.

FIG. 14(a) illustrates the start-up sequence for active devices. Initially, the information terminal 51 sends a search signal to each information device B (active device) through the network 50. The search signal corresponds to the aforementioned seizing signal. To send the search signal, the user should perform a certain operation. For example, the user may search one information device after another by using a Web browser running on the information terminal to send a search signal to a common gateway interface (CGI) program of a Web server running on each information device B. In another possible case, the information terminal 51 uses the user datagram protocol (UDP) to simultaneously send a search signal to all the information devices B.

Upon receiving the search signal, each information device B sends a response signal to the information terminal 51 through the network 50. The response signal contains property information stored in the information device B. Based on the response signals, the information terminal 51 recognizes the presence of remote-controllable information devices around it (where they may be "physically" surrounding it in the real space or "logically" on the network). Then, referring to the property information, it sends an inquiry to the resource center 57 to download resources relating to each identified information device. The resources thus downloaded are temporarily stored in the internal memory. Subsequently, the information terminal 51 assigns a unique ID to each information device B that has responded to the search signal and sends the ID information to the device concerned. This information is equivalent to the temporary address assigned to each communication node in Step MS4 in FIG. 4 of the previous embodiment. Therefore, the IDs hereby assigned to the information devices are unfixed, temporary ones, which may be changed, for example, every time the devices are activated.

With a temporary ID thus assigned, each information device B emits an optical ID signal containing the static ID of the information device B concerned. The content of the information is the same as that of the passive devices. The information terminal 51 receives the ID signal and extracts the pilot signal superimposed on it, as described earlier. Based on this pilot signal, the information terminal 51 recognizes the position of the information device B and then receives and decodes the ID signal having a higher frequency. The two-way data communication performed before the reception of the ID signals does not provide any information for determining which information devices B are within the imaging scope of the information terminal 51 and which are not. Reception of the optical ID signal confirms that the information device B emitting that signal is within the imaging range of the information terminal 51 and should be displayed on the screen. Other information devices B whose optical ID signals are not received should be outside the screen.

Subsequently, the information terminal 51 refers to the property information and checks the validity of the resources stored in the memory. If the resources are invalid (e.g. if the version number included in the property information stored in the cached data is older than that included in the property information obtained from the information device B), the information terminal 51 sends the information device B a request for transmission of the resources. Upon receiving this request, the information device B sends its resources to the information terminal 51. Usually, resources are much larger in data size than the ID signal or other information. Therefore, they should be compressed before transmission. The information terminal 51 stores the newly received resources into the memory in place of the older ones and makes the new resources accessible for the subsequent processes. It is preferable that resources relating to Java™ applications or other control programs are loaded into the memory immediately after they are downloaded. This method is particularly recommendable for a control program that helps the user's operations. Nevertheless, the present invention also allows on-demand execution of the control programs.

Optical ID signals from the information devices B outside the imaging screen do not reach the information terminal 51. Though these devices are not displayed on the screen, the information terminal 51 can receive their ID signals through the network 50 and perform the same process as described earlier. In the present remote control system, the user will usually hold the information terminal 51 so that the information device to be operated comes into a range visible to the user, i.e. the imaging scope of the information terminal 51. Taking this situation into account, it is recommendable to give, higher priorities to the information devices located within the imaging range so that the resources for an information device having a higher priority can be retrieved earlier. This method increases the apparent speed of downloading the resources.

Figure 15:
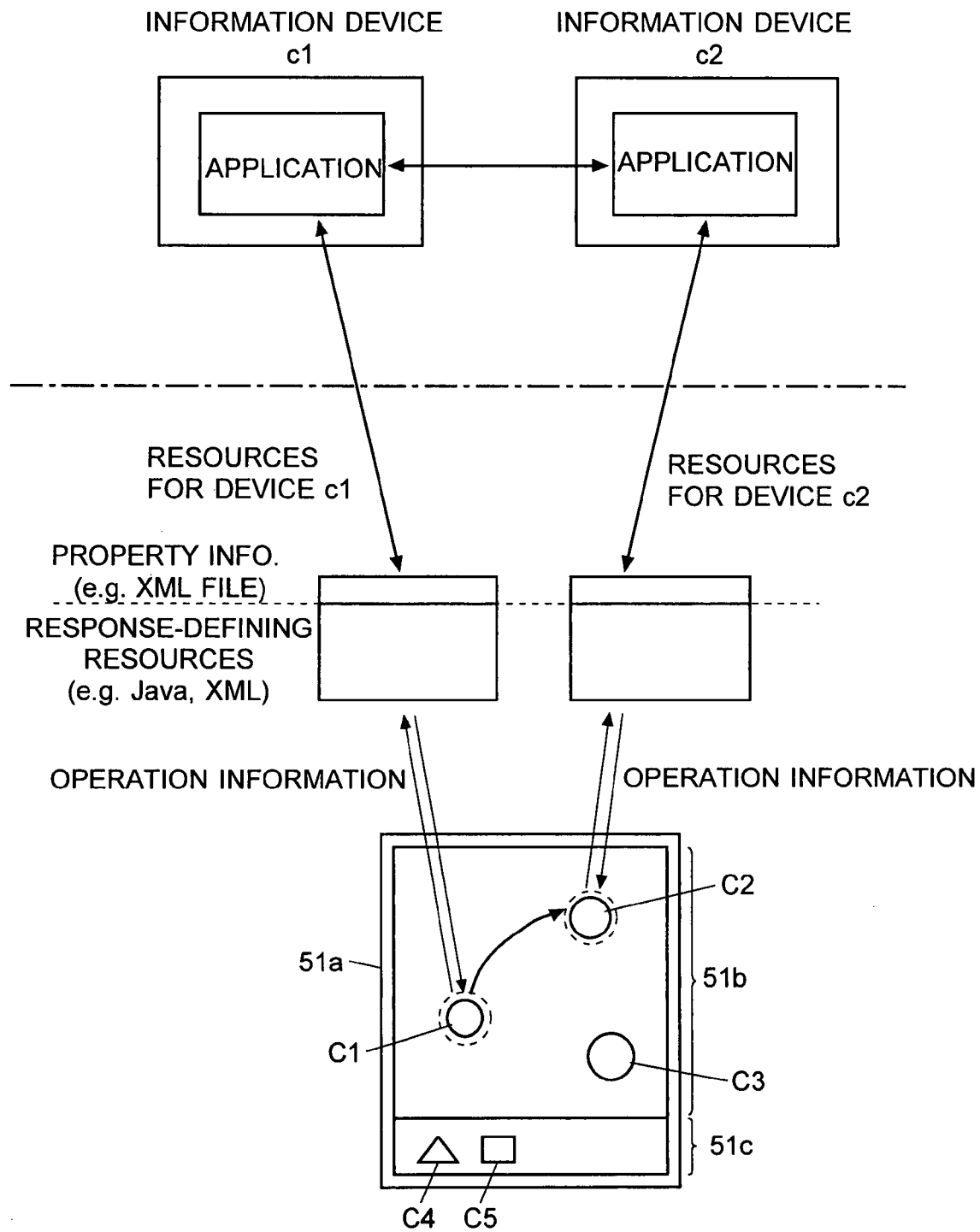
FIG. 15 is a diagram illustrating how the remote control system shown in FIG. 12 controls the information devices in response to an operation performed by the user on the information terminal.

As described thus far, the information terminal 51 retrieves resources associated with each information device A or B. FIG. 15 illustrates how the information terminal 51 remotely controls the information devices according to the user's operations, using the retrieved resources.

In FIG. 15, the icons C1, C2 and C3 in the upper section 51b of the screen 51a of the information terminal 51 represent three information devices located within the imaging range. The two icons C4 and C5 in the lower section 41c of the screen 51a represent two information devices that have been found on the network 50 but outside the imaging range. These icons corresponding to the information devices are created using image files and other data included in the previously retrieved resources. Suppose that the information devices c1 and c2 represented by the icons C1 and C2 are a portable music player and a stereo audio system and the user is going to transfer a music file from the portable music player c1 to the stereo audio system c2 to play music.

When the user performs a certain operation on the icon C1, the information terminal 51 runs a control program (e.g. a Java™ application) associated with the information device c1. This control program displays the artist's name, the name of the album (or song) and other information relating to each piece of music data stored in the portable music player c1. Then the user selects what he or she wants from them. Such an operation is possible on a Java™ application and other control programs for the information device c1, as described above. On the screen 51a, the user selects one or more pieces of music on the screen and moves the icon C1 onto the icon C2 by an operation equivalent to the commonly known "drag and drop" operation. Upon this operation, the information terminal 51 sends control signals corresponding to the above operation through the network 50 to the information devices c1 and c2, by using a function of the response-defining resources included in the resources for the information devices c1 and c2 stored in the information terminal 51.

Upon receiving the aforementioned control signal, each of the information devices c1 and c2 runs a built-in application (a control software program). These programs operate to read out one or more music files from the information device (portable music player) and send them through the network 50 to the information device c2 (stereo audio system). Then, the files are stored in the internal storage medium of the stereo audio system. Subsequently, the stereo audio system plays each piece of music by processing the data of each music file stored in the storage medium. It is of course possible to transfer image files or any kinds of files other than music files. Transferring the data to the mobile phone 41 hand-held is also possible.

As described thus far, in the present remote control system, the information terminal 51 operated by the user functions as a highly sophisticated and versatile remote controller, through which the user can freely control the operations of various information devices around the user and the transfer of data among those devices. It is also possible to perform some control operations on the devices outside the captured image, whose icons are displayed in the lower section 51c of the screen 51a of the information terminal 51.

Finally, it should be clearly understood that the embodiments described thus far are mere examples of the present invention. These embodiments can be changed, modified or expanded within the spirit and scope of the present invention as stated in the CLAIMS section of the present patent application.

The invention claimed is:

1. An information-processing system using free-space optical communication, including an information-collecting apparatus and one or more communication nodes, where the information-collecting apparatus collects predetermined items of information from each of the remote communication node or nodes through free-space optical communication, which is characterized in that:

each of the communication node or nodes includes:

a signal generator for producing a pilot signal having a predetermined frequency onto which an identification signal containing the aforementioned items of information is superimposed, the frequency of the identification signal being higher than that of the pilot signal; and a light transmitter for emitting light containing the signal produced by the signal generator as information, and the information-collecting apparatus includes:

an image capturer having an imaging device with a two-dimensional array of a plurality of micro photo-receiving elements;

a position recognizer for detecting the pilot signal from an optical signal coming from each communication node within a two-dimensional image captured by the image capturer and for recognizing a position of each communication node within the image; and an identification information acquirer for selectively reading detection signals produced by micro photo-receiving elements located at or close to images of corresponding communication nodes recognized by the position recognizer in the image capturer, where a speed of reading the detection signals is higher than that of capturing the two-dimensional image, and for acquiring the aforementioned items of information of each communication node located within the captured image on a basis of the signals read out, wherein the information-collecting apparatus is an information terminal to be operated by a user's hand;

the identification signal superimposed by the signal generator of each communication node minimally contains, as one of the aforementioned items of information, identification information by which the communication node can be identified; and in a process of acquiring signals from one or more pixels from which the identification information of each communication node is obtained, the identification information acquirer specifies auxiliary pixels around a central pixel and reduces or corrects an effect of a hand movement by using the signals read out from the auxiliary pixels.

2. The information-processing system according to claim 1, wherein the identification information acquirer gradually reduces a size of a range within which it selectively reads out pixel signals produced by the micro photo-receiving elements located at or close to each position on the image recognized by the position recognizer in the image-capturer, until it finds one or more pixels from which the identification information of each communication node can be obtained.

3. The information-processing system according to claim 1, wherein the information terminal includes:
- a memory for holding the identification information of the communication node and additional information associated with the identification information according to necessity at least for a predetermined period of time after the communication node concerned has exited from an imaging range of the image capturer; and
- a process restorer for bringing a process back to a condition present immediately before the communication node concerned exited from the imaging range, on a basis of the information held in the memory when the communication node concerned is found again within the imaging range.

4. The information-processing system according to claim 1, wherein the information terminal includes:
- a partial image extractor for extracting image information included in a range having a predetermined shape that corresponds to a shape of the communication node or includes at least a portion of the communication node from the two-dimensional image obtained with the image capturer; and
- an information converter for converting, on the information terminal, the image information extracted by the partial image extractor into an icon or symbol information equivalent to the icon,
- and the symbol information produced by the information converter is associated with the identification information of a communication node for which the icon or the symbol information has been produced.

5. The information-processing system according to claim 1, wherein the information terminal includes:
- a display device for showing the image captured by the image capturer;
- a position information displayer for creating an information object indicating the position of each communication node discerned on a basis of the identification information obtained by the identification information acquirer and for showing the information object on the captured image; and
- a selector for allowing an operator to select one of the communication nodes by choosing one of the information objects indicating the positions of the communication nodes on the image displayed on a screen of the display device.

6. The information-processing system according to claim 5, wherein the information terminal is capable of two-way communications with each communication node using light or radio waves and, after one of the communication nodes is selected through the selector of the information terminal, the system attempts a two-way communication between the information terminal and the selected communication node and then establishes a one-way or two-way link for one-to-one communication between them.

7. The information-processing system according to claim 6, wherein a data communication is performed using light or radio waves at a bit rate higher than that of the identification signal after the one-to-one communication link is established between the selected communication node and the information terminal.

8. A free-space optical communication system using the information-processing system according to claim 7, wherein a one-way or two-way data communication is performed using light after the one-to-one communication link is established between the selected communication node and the information terminal, where a directivity of the aforementioned light is higher than that of the light containing the identification signal as information.

9. The free-space optical communication system according to claim 8, wherein a frequency band of the data communication signal is higher than that of the identification signal.

10. The free-space optical communication system according to claim 8, wherein
- an indicator for selecting one of the communication nodes is displayed on the screen of the display device; and
- an axis of the communication light emitted from the information terminal is adjusted at an object indicated by the indicator.

11. The information-processing system according to claim 2, wherein, in a process of acquiring signals from one or more pixels from which the identification information of each communication node is obtained, the identification information acquirer specifies auxiliary pixels around a central pixel and reduces or corrects an effect of a hand movement by using the signals read out from the auxiliary pixels.

* * * * *